United States Patent [19]

Shelton

[11] Patent Number: 5,044,338
[45] Date of Patent: Sep. 3, 1991

[54] FUEL RAIL VIBRATION DAMPER

[75] Inventor: Randolph A. Shelton, Newport News, Va.

[73] Assignee: Siemens Automotive L.P., Auburn Hills, Mich.

[21] Appl. No.: 468,519

[22] Filed: Jan. 23, 1990

[51] Int. Cl.⁵ .................................. F02M 55/02
[52] U.S. Cl. .................... 123/469; 137/883; 137/351; 123/456
[58] Field of Search ............... 123/468, 469, 470, 472, 123/195 A; 248/635; 137/343, 351, 883; 251/143

[56] References Cited

U.S. PATENT DOCUMENTS

| | | | |
|---|---|---|---|
| 2,393,071 | 1/1946 | Schaechlin | 248/63 S |
| 3,845,923 | 11/1974 | Atkinson | 248/63 S |
| 4,151,822 | 5/1979 | Miura | 123/195 A |
| 4,213,718 | 7/1980 | Lumby | 248/63 S |
| 4,286,777 | 9/1981 | Brown | 248/63 S |
| 4,306,708 | 12/1981 | Gassaway | 248/63 S |
| 4,428,331 | 1/1984 | Zang et al. | 123/52 |
| 4,520,987 | 6/1985 | Eguchi | 248/63 S |
| 4,553,510 | 11/1985 | Yano | 123/195 A |
| 4,793,300 | 12/1988 | Kadoshima | 123/195 A |

FOREIGN PATENT DOCUMENTS 0161693 11/1985 European Pat. Off. ............ 123/470

Primary Examiner—Carl Stuart Miller
Assistant Examiner—Erick Solis
Attorney, Agent, or Firm—George L. Boller; Russel C. Wells

[57] ABSTRACT

A reliable, consistent, facile, and economical mounting of a fuel rail on an engine for attenuating vibration between the fuel rail and the engine. An attaching bracket that is joined to the fuel rail has a hole that aligns with a threaded hole in the engine. An elastomeric grommet is situated in the bracket hole and compressed in a controlled manner by a threaded fastener that is passed through the grommet and threaded into the threaded engine hole until a shoulder of the fastener abuts the engine.

7 Claims, 1 Drawing Sheet

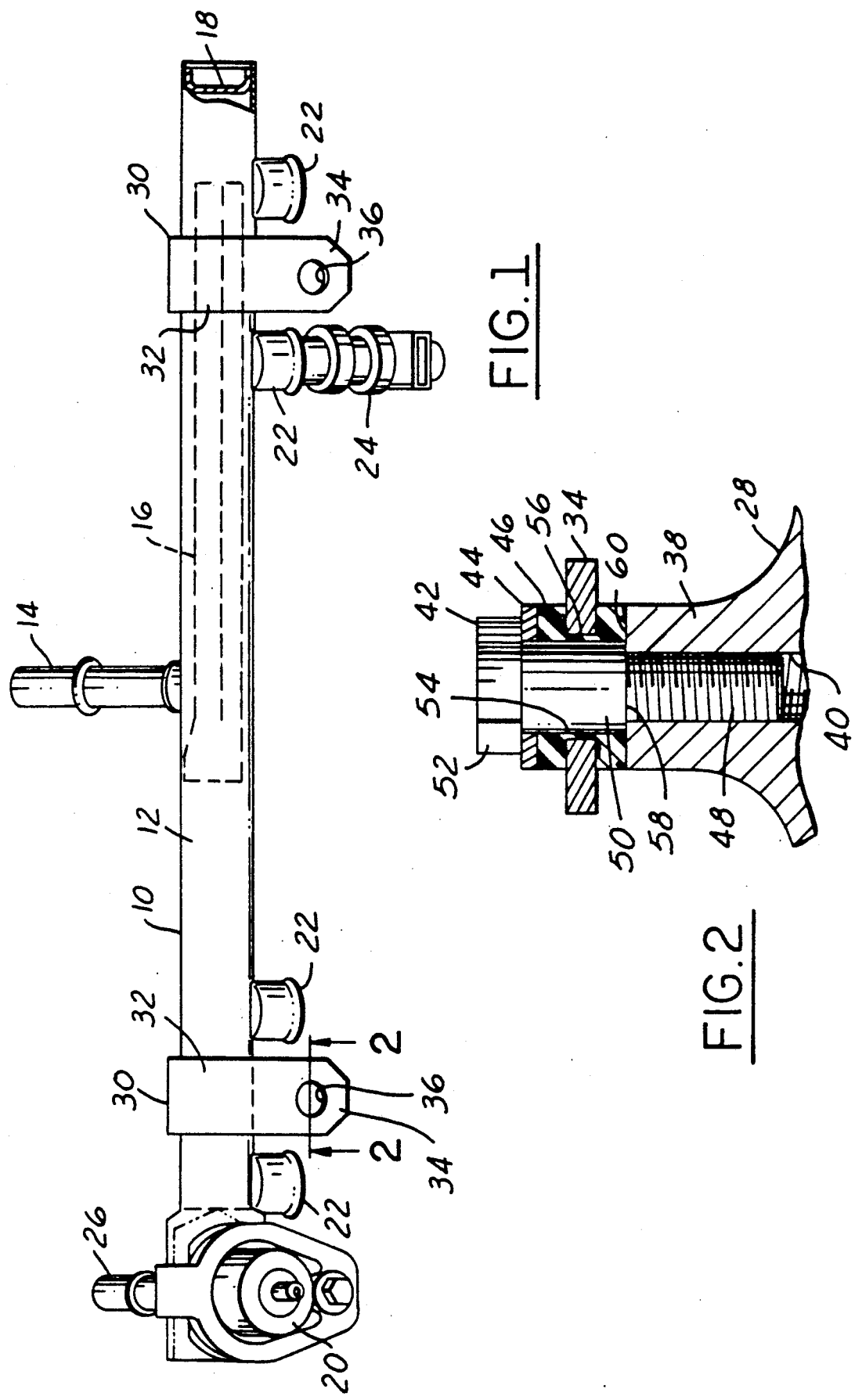

5,044,338

FUEL RAIL VIBRATION DAMPER

BACKGROUND AND SUMMARY OF THE INVENTION

This invention relates generally to fuel-injected internal combustion engines, and more specifically it relates to a new and improved mounting of a fuel rail on an engine.

It is a known practice to mount a fuel rail directly on an engine, and this is typically called a "hard" mount. It has been observed that when certain fuel rails are mounted on certain engine intake manifolds by means of a "hard" mount, vibrations caused by the opening and closing of the electromagnetically-operated injectors and fuel flow pulsations can be transmitted directly to the manifold runners. Sometimes these vibrations may be deemed objectionable, or even detrimental. Accordingly in those situations, other than a "hard" mounting may be appropriate.

The obvious approach to providing vibration attenuation, or isolation, is by disposing some sort of elastomeric means between the fuel rail and the manifold. However, reliable, consistent, facile, and economical assembly of a fuel rail to a manifold on a mass-production basis is not inherently realized by the mere use of an elastomeric pad or the like. Often the objectional vibrations may be consistently and reliably attenuated to non-objectionable levels only by rather strict control of the manufacturing and assembly process. Accordingly, there is a need for obtaining consistent, reliable vibration attenuation and isolation while also minimizing the extent to which such strict control is required, and the present invention is directed to a means for attaining this end.

Once revealed, the invention is quite simple; yet, it provides reliable, consistent, facile, and economical assembly of a fuel rail to a manifold in a manner that provides improved vibration isolation by attenuating objectional vibrations. Moreover, the inventive principles are quite generic in that they are susceptible of application to different engine/fuel rail combinations for attainment of a particular vibration attenuation that is best-suited for each particular combination.

Principles of the invention will be explained in detail with reference to the accompanying drawing which presents a presently preferred exemplary embodiment in accordance with the best mode contemplated at this time for the practice of the invention. With this disclosure, the attributes of the invention will become apparent to the reader.

BRIEF DESCRIPTION OF THE DRAWING

FIG. 1 is a longitudinal view of a fuel rail for a fuel-injected internal combustion.

FIG. 2 is a cross section taken in the direction of arrows 2—2 in FIG. 1, on an enlarged scale, including presentation of a mounting of the fuel rail to an engine in accordance with the inventive principles.

DESCRIPTION OF THE PREFERRED EMBODIMENT

An exemplary fuel rail 10 comprises a generally tubular body 12 having a centrally located inlet nipple 14 via which pressurized liquid fuel is supplied to the rail from a remotely located fuel pump (not shown). An internal baffle 16 creates within the fuel rail a flow path that extends from nipple 14 along one side of the baffle to the right-hand end of the fuel rail, as viewed in FIG. 1, where an end closure 18 forces a U-turn of the flow. Thence, fuel flow is from right to left to a fuel pressure regulator 20 at the left-hand end of the fuel rail. Injector cups 22 are joined to body 12 at appropriate locations along its length to provide communication of the pressurized liquid fuel to electromagnetic fuel injectors 24 (only one being shown in FIG. 1) whose inlets are received in cups 22 in a removably sealed manner. The outlets of the fuel injectors are placed in a conventional manner in communication with the air induction passages (not shown) to the individual engine cylinders. There is a fuel return nipple 26 via which excess fuel is returned to tank (not shown). The operation of the injector system is conventional and will not be described in detail.

For mounting of fuel rail 10 on an engine 28, in particular on the engine intake manifold, one or more brackets 30 are employed. In the example there are two such brackets that are located in spaced apart relation along the length of the fuel rail. Each bracket has a body-engaging portion 32 that is securely joined to body 12 in any conventional manner. The brackets extend transversely of body 12 to terminate in flat tongues, or flanges, 34, each of which comprises a circular through-hole 36. The illustrated brackets are metal stampings of a suitable gauge material.

Engine 28 is provided with two circular bosses 38 at the same spacing distance as brackets 30. Each boss contains a threaded hole 40 that has been coaxially tapped into the boss. When the fuel rail is juxtaposed to the engine for mounting, holes 36 align with threaded holes 40.

The vibration-attenuating mounting of the fuel rail to the engine comprises three separate additional parts at each attachment point, namely a threaded fastener 42, a washer 44, and an elastomeric formed grommet 46.

Each fastener 42 comprises a threaded shank 48, a circular cylindrical body 50 proximal to shank 48, and a polygonally shaped head 52 proximal to body 50. As formed, each grommet 46 has a circular cylindrical shape, comprising a circular through-hole 54 that enables the grommet to fit closely onto body 50 and a circumferentially extending circular groove 56 via which the grommet fits onto the margin around the edge of hole 36 in each bracket tongue 34. Groove 56 is located essentially at the axial mid-point of the grommet. The outside diameters of the top surface of boss 38, of grommet 46, and of washer 44 are substantially identical, and the inside diameter of washer 44 is substantially identical to that of through-hole 54. Head 52 overlaps washer 44.

Preparatory to fastening of the fuel rail to the engine, the grommets are inserted into the bracket holes. For this purpose they have suitable deformability and resiliency. Next, with the grommet-containing holes aligned with the threaded holes 40 in bosses 38, fasteners 42 are passed through the grommets and the threaded shanks 48 are threaded into the complementary holes 40. The fasteners are tightened by means of a suitable tool (not shown) acting upon head 52.

The tightening continues until the shoulder 58 that exists at the merger of shank 48 with body 50 abuts the flat top rim surface 60 of boss 38. A final torquing of head 52 now creates a desired tensioning in the fastener between head 52 and shank 48, with the result that a predetermined amount of axial compressive force is exerted on grommet 46 while the mounting is secured against loosening. The degree of compression of the grommet is determined by the axial dimension of body 50 and the thickness of washer 44. The grommet isolates the bracket from the engine while the fastener is itself isolated from the bracket. The elastomeric character of the grommet and its size, shape, and degree of compression are among the factors that determine the vibration-attenuating character of the mount. The use of known engineering and design techniques and/or empirical testing can determine the best mount configuration for a particular fuel rail/engine combination.

It should be recognized that other equivalent constructions can be employed although the illustrated one is preferred. An example of one form of alternate, but equivalent construction, could comprise, in place of head 52 a threaded stud projecting away from body 50 with a nut threaded onto that stud and tightened against a shoulder. Thus, while a presently preferred embodiment of the invention has been illustrated and described, the inventive principles are applicable to other embodiments.

What is claimed as new is:

1. In a fuel-injected internal combustion engine having an engine-mounted rail via which one or more fuel injectors are supplied with fuel, said rail being mounted on the engine by a mounting means that comprises one or more brackets each of which is fastened to the engine by a corresponding threaded fastening means passing through aperture means in the bracket, the improvement in said mounting means which comprises for at least one of said brackets: (1) an annular elastomeric damper means coaxially disposed with respect to the aperture means of the bracket and isolating the bracket from the engine, (2) said threaded fastening means comprising (a) a threaded shank that is threadedly engaged with a complementary threaded hole in the engine, (b) a body that is proximal to the threaded shank, that is disposed coaxially within the annular elastomeric damper means in isolation from the bracket, and that comprises a shoulder that is caused to forcefully abut the engine around the complementary threaded hole upon tightening of the threaded shank in the complementary threaded hole, and (c) compression-causing means that is proximal to the body in isolation from the bracket and that is disposed in predetermined relationship to the threaded shank to cause a predetermined axial compression of the annular elastomeric damper means when the shoulder is forced into abutment with the engine around the threaded hole.

2. The improvement set forth in claim 1 in which the complementary threaded hole in the engine is in a boss, the body of the threaded fastening means abutting the top of the boss.

3. The improvement set forth in claim 1 in which said annular elastomeric damper means comprises a formed grommet having an annular groove via which the grommet fits onto the edge of the bracket's aperture means.

4. The improvement set forth in claim in which said compression-causing means comprises a head that is integral with the body and that provides a tool engagement surface for a tool that is used to tighten the threaded shank into the complementary threaded hole.

5. The improvement set forth in claim 4 in which said compression-causing means also includes a washer that is disposed between said head and said annular elastomeric damper means.

6. The improvement set forth in claim 1 in which the bracket's aperture means comprises a hole having a circular edge, said annular elastomeric damper means comprises a formed annular grommet having a circular groove via which the grommet fits onto the circular edge of said hole, said grommet having a circular shaped through-hole within which said body is disposed, said body having a circular cylindrical shape fitting closely within said through-hole, said compression-causing means comprises a polygonally shaped head that is integral with the body, and a washer that is disposed between said head and said grommet, whereby said threaded shank may be tightened in said complementary threaded hole by use of a tightening tool engaging said head to cause said grommet to be axially compressed between said washer and the margin around the edge of said complementary threaded hole.

7. The improvement set forth in claim 6 in which the complementary threaded hole in the engine is in a circular boss, the body of the threaded fastening means abutting the top of the boss, the outside diameter of the grommet having substantially the same diameter as the boss at their mutual abutment, said grommet having a generally constant outside diameter, as formed, and said washer having substantially the same outside diameter as the grommet.

* * * * *